Figure 1:
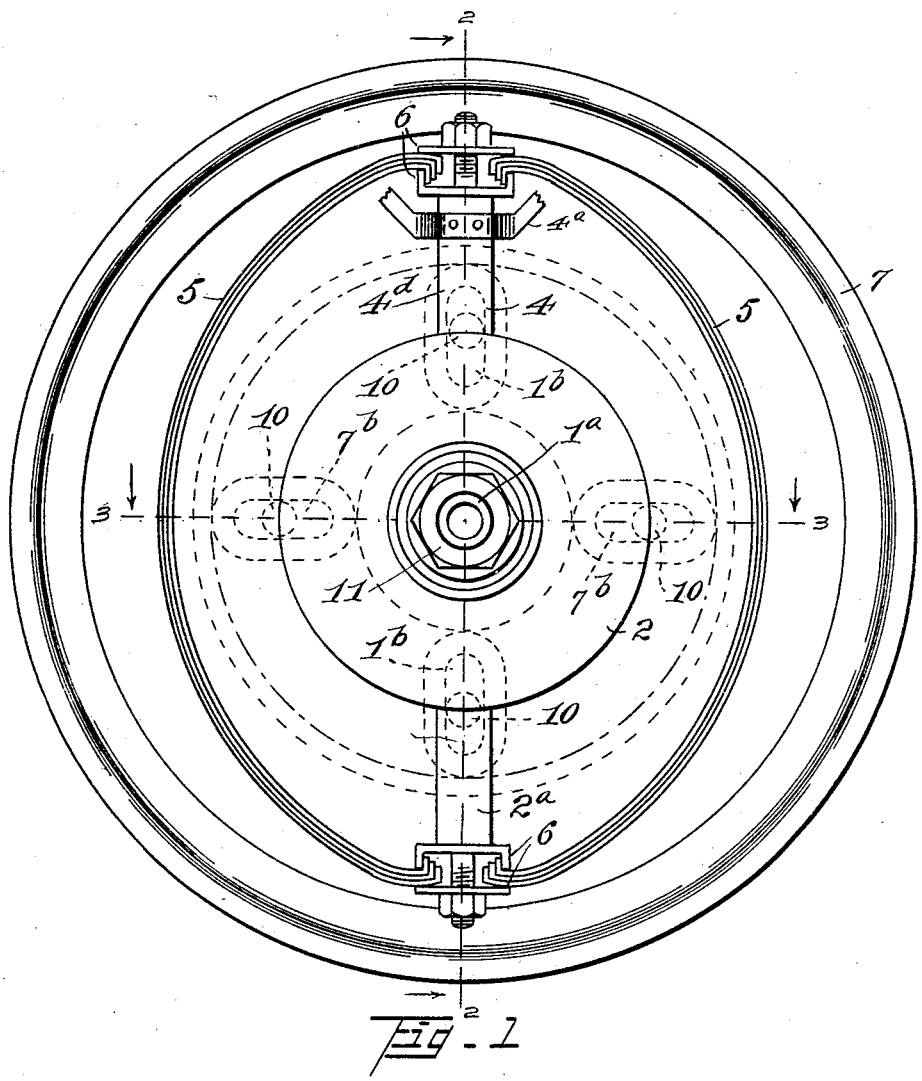

W. F. J. GOERSCH.
SUSPENSION WHEEL.
APPLICATION FILED DEC. 20, 1920.

1,389,826.

Patented Sept. 6, 1921.
2 SHEETS—SHEET 1.

Inventor
WILLIAM F. J. GOERSCH

By Louis F. Griswold.

Attorney

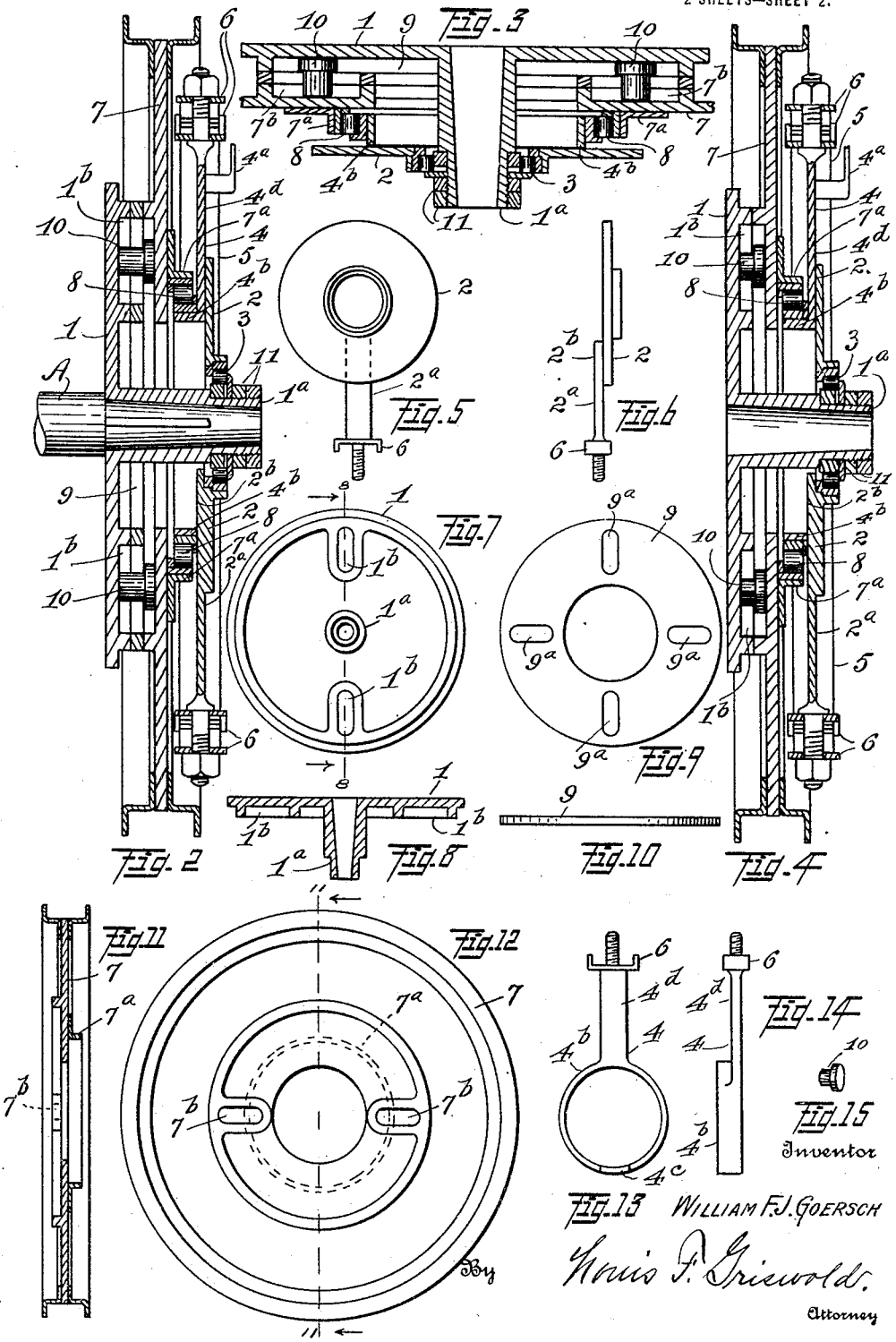

UNITED STATES PATENT OFFICE.

WILLIAM F. J. GOERSCH, OF CLEVELAND, OHIO.

SUSPENSION-WHEEL.

1,389,826.　　　　Specification of Letters Patent.　　Patented Sept. 6, 1921.

Application filed December 20, 1920. Serial No. 431,898.

*To all whom it may concern:*

Be it known that I, WILLIAM F. J. GOERSCH, having declared my intention to become a citizen of the United States, residing at Cleveland, in the county of Cuyahoga and State of Ohio, have invented certain new and useful Improvements in Suspension-Wheels, of which the following is a specification.

This invention relates to an improvement in vehicle wheels which are especially adapted for use in connection with motor vehicles, and it has for its principal object the provision of a resilient wheel that is durable and efficient.

Another object of the invention is to provide a wheel of this character which is simple in construction, easy to assemble, and economical to manufacture.

With these and other apparent objects and advantages in view, the invention consists in the novel construction, combination and arrangement of parts as hereinafter described and particularly pointed out in the appended claims, reference being had to the accompanying drawings which are made part of the specification, similar reference characters being employed to designate corresponding parts.

In the drawings Figure 1 is an outside elevation of the improved wheel. Fig. 2 is a section of the driving wheel taken on line 2—2 of Fig. 1. Fig. 3 is a section on line 3—3 of Fig. 1. Fig. 4 is a section, similar to Fig. 2, of the forward or loose wheel. Figs. 5 to 15, inclusive, are illustrations of details of the construction, on a reduced scale, Figs. 5 and 6 being front and side elevation, respectively, of a non-rotating spring-supporting element. Fig. 7 is an outer face view of one of the rotating elements, and Fig. 8 is a section on line 8—8 of Fig. 7. Figs. 9 and 10 are side, and face views, respectively, of a driving disk used in the driven wheel construction. Fig. 11 is a section on line 11—11 of Fig. 12, said Fig. 12 being an inside face view of the traction element. Figs. 13 and 14 are front and side elevations, respectively, of a second non-rotating element employed, and Fig. 15 is a perspective view of one of a series of guide rollers embodied in the construction.

The improved wheel construction provides for two non-rotating, co-acting elements mounted on the wheel hub, and a plurality of co-acting elements which are held in suspension by springs, and rotate on the non-rotatable members.

In the present embodiment, the driven member 1 is provided with a hub $1^a$, on the outer portion of which is mounted a supporting member 2, anti-friction bearings 3 being provided between said member 2 and the hub $1^a$. A second supporting element 4 is rigidly connected with some stationary part of the vehicle by means of a suitable connection $4^a$. The member 4 is not mounted directly on the hub $1^a$, but is provided with an in-turned circular flange $4^b$. The member 2 has a radial arm $2^a$ thereon, and the member 4 is provided with a recess $4^c$, Fig. 13, in which the extension $2^b$ of the arm $2^a$ rides. The member 4 is also provided with a radial arm $4^d$, and when assembled the arms $4^d$ and $2^a$ are in vertical alinement, being retained in this relation by the recess $4^c$, the member $2^b$ being vertically movable in said recess.

Elliptic springs 5 connect the outer end portions of the arms $2^a$ and $4^d$, suitable clamping devices 6 being provided for this purpose.

The traction wheel member 7 is provided with a circular flange $7^a$ which is mounted on the flange $4^b$ of the member 4, anti-friction bearings 8 being interposed between the two flanges. Two guide grooves $7^b$, with closed ends, are provided on the inner face of member 7. These grooves are arranged radially in diametrical alinement, as shown in Fig. 12. The driven member 1 is provided with two similar grooves $1^b$ facing the grooves $7^b$ but arranged radially in a diametrical alinement at right angles to the grooves $7^b$. In the driven wheel, a driving disk 9 having slots $9^a$ therein which are adapted to register with the grooves $7^b$ and $1^b$, is interposed between the member 1 and the member 7. Guide rollers 10 extending through the slots $9^a$ and into the grooves $1^b$ and 7ᵇ provide driving connections between the member 1 and the traction element 7. The right angle relative arrangement of the two pairs of grooves 1ᵇ and 7ᵇ allows the members 1 and 7 to move radially independent of each other.

When the wheel is assembled the elements are held in their proper coöperative relation by retaining nuts 11 on the outer terminal of the hub 1ᵃ, the members 2 and 4 being non-rotatable. The member 1 being keyed or otherwise fixed on the driving axle A, and co-acting with the traction member 7 through the operation of the rollers 10 in the guide grooves 1ᵇ and 7ᵇ, rotates said traction member on the roller-bearings 8 which are on the stationary member 4. The hub 1ᵃ rotates freely on the roller-bearings 3 in the stationary member 2, and the elements are thereby centralized or held in concentric alinement when the wheel is in normal position, free from load or tread pressure.

It will be seen that, under the load of the vehicle, the springs 5 will be compressed and the rotation of the member 7 will be vertically eccentric to the rotation of the driving members, due to the member 4 being stationary and the member 7 rotating thereon, while the member 2, with the member 1 operating therein, is shifted vertically and held under tension by the springs 5. The novel arrangement of the grooves in the faces of members 1 and 7, and the corresponding slots 9ᵃ in the disk 9, and the co-action of the elements 10 with said grooves and slots provides the eccentric movement.

The rotating elements of the wheel are held in yielding suspension by being mounted on the non-rotating members 2 and 4 which are connected by the springs 5.

The driving disk 9 is not used in the wheels which revolve on the axle, as illustrated in Fig. 4, but the co-action of the members 1 and 7 with the connecting guide members 10 is the same as in the driven wheel.

When the improved wheels are under a steady load and operating on an even surface, the springs remain under a constant unchanging degree of compression, only changing and quickly recuperating when the load is varied, or obstacles are encountered on the tread surface. This is a salient feature of the invention. The life or utility of the springs is prolonged, as they are not subjected to continuous alternate contraction and expansion which causes springs to granulate.

In service, when the wheels are positioned as illustrated, with the springs vertically disposed, and the members 2 and 4 in the relative positions as shown, the springs, in the performance of their functions, are compressed constantly, the degree of compression varying according to the load, or obstructions encountered. If the springs become lazy or slow to act, due to prolonged compression, the wheels may be positioned so that the members 2 and 4 are reversed. This changes the major action of the springs and reënergizes them which increases the efficiency of the wheel.

The drawings referred to in the above description, illustrate an embodiment of my invention suitable for explanatory purposes, it being understood that various changes in form, proportions, size and minor details of construction, within the scope of the claims, may be resorted to without departing from the spirit or sacrificing any of the advantages of the invention.

What I claim and desire to secure by Letters Patent is—

1. A resilient suspension wheel comprising a rotatable member provided with a hub, a non-rotating element mounted on said hub, a fixed supporting element with which said non-rotating element has a correlative radial movement and is suspended therefrom by expansion springs provided, said springs being firmly attached to the two non-rotating elements, a traction wheel member rotatable on bearings provided on fixed element around the hub, driving means connecting the traction element and the rotating hub element, said means providing correlative radial movement of said rotating elements.

2. In a resilient suspension wheel, the combination of a rotatable element provided with a hub and a concentric disk; a non-rotating element mounted on said hub and provided with a radial arm; a fixed element provided with a radial arm in alinement with the radial arm on the first named non-rotating element, said non-rotating element having a correlative radial movement with the fixed element; elliptic springs connecting the radial arms of the two non-rotating elements; a traction wheel element rotatably mounted on the fixed element; roller driving members operating in guides provided on the adjacent faces of the hub disk and the traction element. said rollers and guides providing correlative radial movement of said rotating elements.

3. In a resilient suspension wheel, the combination of a rotatable element provided with a hub and a concentric disk; a non-rotating element mounted on said hub and provided with a radial arm; a fixed element provided with a radial arm in alinement with the radial arm on the first named non-rotating element, said non-rotating element having a correlative radial movement with the fixed element; elliptic springs connecting the radial arms of the two non-rotating elements; a traction wheel element rotatably mounted on the fixed element; guide grooves arranged in diametrical alinement on the inner face of the traction element; guide grooves in the adjacent face of the hub disk, said last named grooves arranged in diametrical alinement in right-angle relation to the grooves in the traction element; an idler disk interposed between the hub disk and the traction element, said idler disk being provided with slots which correspond with the guide grooves in both of the rotatable elements; and roller driving members operating in said slots and guide grooves, said rollers, slots, and guide grooves co-acting providing correlative radial movement of said rotating elements.

In testimony whereof I affix my signature.

WILLIAM F. J. GOERSCH.